Patented Mar. 27, 1934

1,952,678

UNITED STATES PATENT OFFICE 1,952,678

CONDENSATION PRODUCTS OF THE ANTHRAQUINONE SERIES

Max Albert Kunz, Mannheim, and Karl Koeberle, Ludwigshafen - on - the - Rhine, Germany, assignors to General Aniline Works, Inc., New York, N. Y., a corporation of Delaware No Drawing. Application April 18, 1930, Serial No. 445,519. In Germany April 27, 1929

13 Claims. (Cl. 260—61)

The present invention relates to the production of condensation products of the anthraquinone series and vat dyestuffs obtainable therefrom by further condensation.

We have found that valuable nitrogenous condensation products of the anthraquinone series are obtained by condensing amino-anthraquinone carboxylic acid derivatives having at least one hydrogen atom attached to the nitrogen atom of the amino group and the carboxylic group of which is no longer capable of forming salts by reason of substitution, with negatively substituted cyclic compounds, the said anthraquinone derivatives being defined as having the following diagrammatic composition:

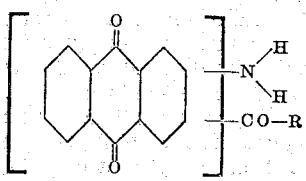

in which one hydrogen atom of the amino group may be substituted, and R is an aryl-, alkoxy-, phenoxy-, alkylphenoxy-, phenylalkoxy- group or an amino group in which the hydrogen atoms may be replaced by other monovalent radicles. The most suitable amino-anthraquinone carboxylic acid derivatives are those as contain the amino and the substituted carboxylic acid group in ortho position to each other. The reaction is preferably carried out in the presence of organic solvents or diluents as for example naphthalene or nitrobenzene, and of agents for combining with acids as for example alkali metal or earth alkali metal salts of weak acids or earth alkali metal oxides, organic bases as for example collidine and the like, condensing catalysts, as for example copper, nickel and like metals or compounds of the same, being added to the reaction mixture if desired.

The esters of amino carboxylic acids, as for example the esters of 1-amino-2-anthraquinone carboxylic acid or their derivatives are especially suitable for this condensation. Suitable negatively substituted cyclic compounds are especially aromatic compounds and in particular such aromatic compounds as contain a system of four or more condensed rings. Such negatively substituted compounds are for example the nitro and in particular halogen derivatives of benzene, naphthalene, anthracene, phenanthrene, perylene and especially the keto compounds of the same, in particular such as are capable of being vatted, also the halogen compounds of anthanthrones, dibenzanthrones, isodibenzanthrones, allo-ms-naphthodianthrones, dibenzopyrenequinones, ms-benzdianthrones, ms-naphthodianthrones, ms-anthradianthrones, pyranthrones, acridones, flavanthrones, benzanthronepyrazolanthrones, indigo and thioindigo, and also the halogen substitution products of dipyrazolanthrones and their alkylation products, as well as the halogen derivatives of dicarboxylic acid anhydride condensation products with ortho diamines, derivatives and homologues of the same and many other similar compounds. If desired the halogens in polyhalogen compounds may be only partially replaced by aminoanthraquinone carboxylic acid esters and the like.

The condensation products which are frequently obtained in crystalline form are particularly valuable as intermediate products for the manufacture of dyestuffs, and to some extent they are themselves valuable pigment and vat dyestuffs. If necessary the condensation products may be purified by known and suitable methods as for example by crystallization from sulphuric acid or organic solvents, by boiling up with these agents or by treatment with oxidizing agents as for example by treatment of their pastes with hypochlorite. As far as the products are themselves dyestuffs they dye very fast shades having a great variety of colours according to the reaction components selected.

The condensation products obtainable in the aforedescribed manner can be converted into new valuable nitrogenous compounds, which possess special interest both as dyestuffs and as initial materials for the production of new dyestuffs by a treatment with acid or alkaline condensing agents. For the said subsequent condensation those condensation products as are derived from anthraquinone derivatives containing the amino and substituted carboxylic acid groups in ortho position to each other are particularly suitable. Agents for withdrawing water as for example a mixture of manganese dioxide and sulphuric acid, or anhydrous metal chlorides or acid chlorides, such as for example phosphorus pentachloride are particularly useful for the condensation reaction. The reaction may be carried out in solvents or suspending agents and in the presence of condensing catalysts, such as for example copper, nickel, silver and their compounds. By this reaction it is very probable that a condensation to the corresponding acridone derivatives takes place, and also frequently a further condensation to higher molecular ring systems. The yields are usually excellent. The dyestuffs dye cotton a great variety of shades according to the initial materials selected and are frequently valuable pigment dyestuffs. The new products directly after the condensation reaction, that is to say without isolating the products, may be purified by any known or suitable methods, as for example by crystallization, sublimation, purification by way of their oxonium salts or by treatment with oxidizing agents as for example in the form of their pastes with hypochlorite. They may also be converted according to the usual methods into their leuco preparations, as for example into leuco esters.

The following examples will further illustrate the nature of this invention but the invention is not restricted to these examples. The parts are by weight.

Example 1

49 parts of dibromo-3.4.8.9-dibenzopyrene-5.10-quinone (obtainable by brominating the said dibenzopyrenequinone in chlorosulphonic acid in the presence of antimony) are boiled while stirring in 1000 parts of naphthalene with 50 parts of sodium acetate, 10 parts of copper oxide and 60 parts of 1-amino-2-anthraquinone carboxylic acid ethyl ester (prepared from 1-aminoanthraquinone-2-carboxylic acid via the acid chloride with ethyl alcohol) until the reaction product is practically free from bromine. The whole is then allowed to cool, is diluted with chlorbenzene or toluene and filtered by suction. The diluent may be distilled off, if desired under reduced pressure or with steam or with both, with equal effect. The residue is freed from inorganic impurities by extraction with water and dilute acid and is dried. The reaction product which is obtained in practically a quantitative yield is a powder which crystallizes in the form of Bordeaux red needles and dissolves in concentrated sulphuric acid to give a blue red solution. It yields a brown vat and dyes cotton red violet shades.

Instead of the 1-amino-2-anthraquinone carboxylic acid ethyl ester, the methyl or phenyl esters (prepared in an analogous manner to the ethyl ester) may be employed for the condensation. The condensation product obtainable in the same manner from the aforesaid dibromo-3.4.8.9-dibenzopyrene-5.10-quinone with 2 molecular proportions of 2-amino-3-anthraquinone carboxylic acid ethyl ester is a brown powder.

Example 2

41 parts of the bromo-4.5.8.9-dibenzopyrene-3.10-quinone prepared by brominating the said quinone in nitrobenzene are boiled in 500 parts of naphthalene with 50 parts of sodium acetate, 10 parts of copper oxide and 30 parts of 1-amino-2-anthraquinone carboxylic acid ethyl ester until the reaction product is practically free from bromine. The whole is then worked up as described in Example 1. The reaction product obtained is a violet red powder which gives a brown vat and dyes cotton violet shades.

Example 3

52 parts of 6-chlorobenzanthrone in 1000 parts of naphthalene are boiled with 25 parts of sodium acetate, 1.5 parts of copper acetate and 60 parts of 1-amino-2-anthraquinone carboxylic acid methyl ester while stirring until the reaction product is practically free from chlorine. The mixture is then worked up in the usual manner. The condensation product obtained is a crystalline yellow brown powder which dissolves in concentrated sulphuric acid giving an orange colouration.

Example 4

9.2 parts of dibromoanthanthrone (prepared by the bromination of anthanthrone in 5 per cent oleum) in 200 parts of naphthalene are boiled while stirring with 10 parts of sodium acetate, 1 part of copper oxide and 12 parts of 1-amino-2-anthraquinone carboxylic acid ethyl ester until the reaction product is practically free from bromine. The whole is then worked up as described in Example 1. The condensation product, obtained in excellent yields in the form of feltlike violet needles, dissolves in concentrated sulphuric acid giving a brown red colouration, gives a green vat and dyes the vegetable fibre violet shades.

Dichloro-, diiodo-, chloroiodo- or bromoiodoanthanthrones may be employed as initial materials instead of dibromoanthranthrone.

For the reaction naphthalene may be replaced by nitrobenzene.

Example 5

5.6 parts of dibromo-allo-ms-naphthodianthrone (prepared from allo-ms-naphthodianthrone by bromination in nitrobenzene) are boiled while stirring in 150 parts of naphthalene with 6 parts of 1-amino-2-anthraquinone carboxylic acid ethyl ester until the condensation product is practically free from bromine. The whole is then worked up as described in Example 1. The reaction product forms green blue crystals and dissolves in concentrated sulphuric acid giving a green colouration. It dyes cotton blue grey shades from a brown red vat.

Example 6

62 parts of 6.6'-dibromoisodibenzanthrone in 1000 parts of nitrobenzene are boiled while stirring with 100 parts of sodium acetate, 15 parts of copper oxide and 60 parts of 1-amino-2-anthraquinone carboxylic acid ethyl ester until the reaction product is practically free from bromine, and the whole is then worked up in the usual manner. The reaction product, which is obtained in excellent yields, is a blue crystalline powder which dissolves in concentrated sulphuric acid giving a green colouration and dyes cotton from a blue green vat powerful reddish blue shades of excellent fastness.

Example 7

33.5 parts of 2-iodoanthraquinone in 100 parts of naphthalene are boiled while stirring with 50 parts of sodium acetate, 3 parts of copper oxide and 30 parts of 1-amino-2-anthraquinone carboxylic acid ethyl ester until the splitting off of hydriodic acid is completed. The whole is then allowed to cool and is worked up in the usual manner. The reaction product, obtained in the form of red crystals, gives an orange vat and dissolves in concentrated sulphuric acid giving a green yellow colouration.

In an analogous manner a crystalline orange red condensation product is obtained from 1-chloroanthraquinone or 1-bromo- or 1-iodo-anthraquinone.

Example 8

45 parts of 3.3'-dibromoflavanthrone in 1000 parts of naphthalene are boiled while stirring with 50 parts of calcined soda, 10 parts of copper oxide and 60 parts of 1-amino-2-anthraquinone carboxylic acid ethyl ester until there is no further increase in the formation of dyestuff. The whole is then allowed to cool and is worked up in the usual manner. The reaction product obtained, which is a green blue crystalline powder, gives a blue vat, dyes cotton green shades and dissolves in concentrated sulphuric acid giving a green brown colouration.

In an analogous manner a green blue condensation product is obtained by condensation of trichloroanthraquinonebenzacridone (obtainable by condensation of 1-chloroanthraquinone with anthranilic acid, conversion of the condensation product into the corresponding acridone and chlorination thereof) with one molecular proportion of the ester employed in this example.

Example 9

4.6 parts of dibromoanthanthrone in 100 parts of naphthalene are boiled for several hours while stirring with 5 parts of sodium acetate, 1 part of copper carbonate and 6.5 parts of 1-amino-2-anthraquinone carboxylic acid anilide and after cooling the whole is worked up in the usual manner. The reaction product obtained, which is a dark blue crystalline powder, dissolves in concentrated sulphuric acid giving a yellow green colouration and gives a brown red vat from which blue dyeings are obtained.

By condensing the aforesaid dibromoanthanthrone with 1-amino-2-anthraquinone carboxylic acid methyl ester a violet condensation product is obtained.

The corresponding condensation product with 1-amino-2-anthraquinone carboxylic acid amide is a violet blue powder which dissolves in concentrated sulphuric acid giving a green colouration, gives a brown red vat and dyes blue violet shades.

Example 10

50 parts of the condensation product of dibromo-3.4.8.9-dibenzopyrene-5.10-quinone and 2 molecular proportions of 1-aminoanthraquinone-2-carboxylic acid ethyl ester prepared according to Example 1 are dissolved while stirring in 500 parts of concentrated sulphuric acid and slowly heated to from 110° to 120° centigrade. The whole is then kept at this temperature until a sample taken out is no longer sensitive to alkali; when this is the case 100 parts of water are added, the whole is allowed to cool and the oxonium salt of the reaction product which separates out in the form of violet needles is filtered by suction. By the addition of further amounts of water to the filtrate the remainder of the reaction product separates out. When hydrolyzed the oxonium salt yields the reaction product in the form of ruby red crystals. It dissolves in concentrated sulphuric acid giving a rose red colouration, gives a blue vat and dyes cotton powerful clear red brown shades of excellent fastness.

Condensation products giving brown dyeings are obtained in an analogous manner from the condensation product of monobromo-3.4.8.9-dibenzopyrene-5.10-quinone with 1-aminoanthra-quinone-2-carboxylic acid phenyl ester or from monobromo-4.5.8.9-dibenzopyrene-3.10-quinone with 1-amino-anthraquinone-2-carboxylic acid amide or with 1-aminoanthraquinone-2-carboxylic acid methyl ester or with anthranilic acid methyl ester.

Instead of the imido-ortho-carboxylic acid derivatives the corresponding free imido-ortho-carboxylic acids may be subjected to condensation, and in this manner analogous reaction products are obtained.

Example 11

25 parts of the condensation product of 6-halogen-benzanthrone with 1-aminoanthraquinone-2-carboxylic acid methyl ester obtainable according to Example 3 are introduced while stirring at from 120° to 130° centigrade into a melt of 200 parts of caustic potash and 150 parts of ethyl alcohol. When all has been introduced the temperature is raised to from 200° to 250° centigrade while distilling off the alcohol and the whole is kept at this temperature until a sample taken out gives grey dyeings fast to alkali. The whole is then allowed to cool, the reaction product is taken up with water, any dyestuff present in the reduced form is oxidized in the usual manner and the whole filtered off by suction. The reaction product, obtained in the form of a black powder, dissolves in concentrated sulphuric acid giving a violet colouration, and gives a violet vat from which the vegetable fibre, according to the amount of the dyestuff, is dyed violet grey to black shades of very good fastness.

A similar dyestuff is obtained by the condensation of the initial material with sulphuric acid in the manner described in Example 10 and subsequent treatment of the reaction product with alcoholic potash.

Example 12

50 parts of the condensation product of 8-chlorobenzanthrone with 1-aminoanthraquinone-2-carboxylic acid methyl ester are dissolved in 500 parts of concentrated sulphuric acid and heated at from 110° to 120° centigrade until the reaction product has become insoluble in alkali. The whole is then allowed to cool and is worked up as described in Example 10. The reaction product obtained is a brown powder which dissolves in concentrated sulphuric acid giving an orange brown colouration, gives a brown vat and dyes the vegetable fibre therefrom extremely fast brown shades.

The corresponding condensation product prepared in the same manner from 6-chlorobenzanthrone gives yellow brown shades having similar properties of fastness.

What we claim is:—

1. Condensation products of the anthraquinone series corresponding to the general formula:

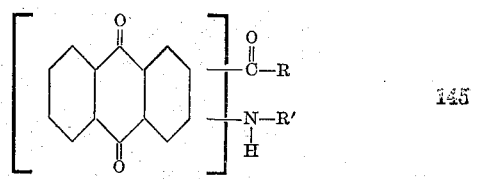

in which R stands for the group -OX wherein X denotes an alkyl-, aryl or an aralkyl radicle or an amino group, and R' for the radicle of an aromatic compound containing a system of at least 4 condensed rings and at least one keto group, the substituted carboxylic and amino groups being in ortho position to each other.

2. Condensation products of the anthraquinone series corresponding to the general formula:

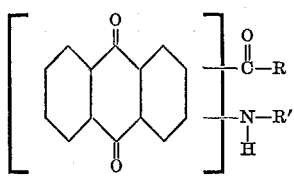

in which R stands for the group -OX wherein X denotes an alkyl-, aryl or an aralkyl radicle or an amino group, and R' for the radicle of an aromatic compound containing a system of at least 4 condensed rings and capable of being vatted, the substituted carboxylic and amino groups being in ortho position to each other.

3. Condensation products of the anthraquinone series corresponding to the general formula:

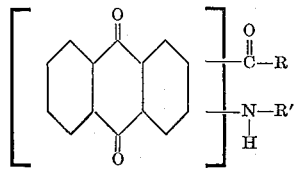

in which R stands for the group -OX wherein X denotes an alkyl-, aryl or an aralkyl radicle or an amino group, and R' for the radicle of an aromatic carboxylic compound containing a system of at least 4 condensed rings and capable of being vatted, the substituted carboxylic and amino groups being in ortho position to each other.

4. Condensation products of the anthraquinone series corresponding to the general formula:

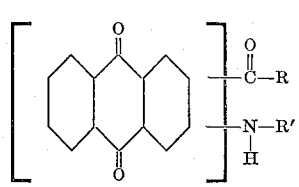

in which R stands for the group -OX wherein X denotes an alkyl-, aryl or an aralkyl radicle or an amino group, and R' for the radicle of carboxylic compound containing the pyrene ring system and capable of being vatted, the substituted carboxylic and amino groups being in ortho position to each other.

5. Condensation products of the anthraquinone series corresponding to the general formula:

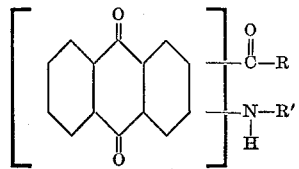

in which R stands for the group -OX wherein X denotes an alkyl-, aryl or an aralkyl radicle or an amino group, and R' for the radicle of a dibenzopyrenequinone, the substituted carboxylic and amino groups being in ortho position to each other.

6. The condensation product of the anthraquinone series corresponding to the formula:

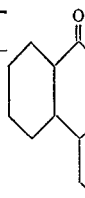

dissolving in concentrated sulphuric acid to give a blue red solution and dyeing cotton from a brown vat red violet shades.

7. A process for the production of condensation products of the anthraquinone series, which comprises heating a compound selected from the group consisting of esters and amides of ortho-aminoanthraquinone carboxylic acids in an inert organic solvent with an aromatic compound containing at least 4 condensed rings and a negative substituent selected from the group consisting of halogen and nitro substituents.

8. A process for the production of condensation products of the anthraquinone series, which comprises heating a compound selected from the group consisting of esters and amides of ortho-aminoanthraquinone carboxylic acids in an inert organic solvent with an aromatic compound containing at least 4 condensed rings and a negative substituent selected from the group consisting of halogen and nitro substituents in the presence of an acid-binding agent.

9. A process for the production of condensation products of the anthraquinone series, which comprises heating a compound selected from the group consisting of esters and amides of ortho-aminoanthraquinone carboxylic acids in an inert organic solvent with an aromatic compound containing at least 4 condensed rings and a negative substituent selected from the group consisting of halogen and nitro substituents in the presence of an acid-binding agent and a condensing catalyst selected from the group consisting of copper and its compounds.

10. A process for the production of condensation products of the anthraquinone series, which comprises heating a compound selected from the group consisting of esters and amides of ortho-aminoanthraquinone carboxylic acids in an inert organic solvent with an aromatic compound containing at least 4 condensed rings, at least one keto group and containing a negative substituent selected from the group consisting of halogen and nitro substituents.

11. A process for the production of condensation products of the anthraquinone series, which comprises heating a compound selected from the group consisting of esters and amides of ortho-aminoanthraquinone carboxylic acids in an inert organic solvent with an aromatic compound containing at least 4 condensed rings capable of being vatted and containing a negative substituent selected from the group consisting of halogen and nitro substituents.

12. A process for the production of condensation products of the anthraquinone series, which comprises heating a compound selected from the group consisting of esters and amides of ortho-aminoanthraquinone carboxylic acids in an inert organic solvent with a halogenated dibenzopyrenequinone.

13. A process for the production of condensation products of the anthraquinone series, which comprises heating a 1-amino-anthraquinone-2-carboxylic ester in an inert organic solvent with a dibromo-3.4.8.9-dibenzopyrene-5.10-quinone.

MAX ALBERT KUNZ.
KARL KOEBERLE.